(12) United States Patent
Ushida

(10) Patent No.: US 6,690,954 B2
(45) Date of Patent: Feb. 10, 2004

(54) PORTABLE TELEPHONE

(75) Inventor: Bunji Ushida, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/788,460

(22) Filed: Feb. 21, 2001

(65) Prior Publication Data

US 2001/0005687 A1 Jun. 28, 2001

Related U.S. Application Data

(63) Continuation of application No. PCT/JP99/04059, filed on Jul. 28, 1999.

(51) Int. Cl.[7] .................................................. H04B 1/38
(52) U.S. Cl. ...................... 455/563; 455/569.2; 704/246
(58) Field of Search ............................... 455/550.1, 563, 455/564, 569.1, 569.2, 575.9, 90.3; 379/88.01–88.03; 704/233, 275, 246

(56) References Cited

U.S. PATENT DOCUMENTS

| | | | | |
|---|---|---|---|---|
| 5,165,095 A | * | 11/1992 | Borcherding | 379/88.03 |
| 5,222,121 A | * | 6/1993 | Shimada | 379/88 |
| 5,842,139 A | * | 11/1998 | Muramatsu et al. | 455/563 |
| 6,157,844 A | * | 12/2000 | Doran et al. | 455/552 |
| 6,212,408 B1 | * | 4/2001 | Son et al. | 455/563 |
| 6,260,012 B1 | * | 7/2001 | Park | 704/236 |
| 6,263,216 B1 | * | 7/2001 | Seydoux et al. | 455/564 |
| 6,272,361 B1 | * | 8/2001 | Courtis et al. | 455/569 |
| 6,449,496 B1 | * | 9/2002 | Beith et al. | 455/563 |
| 6,459,911 B1 | * | 10/2002 | Hijii | 455/563 |

FOREIGN PATENT DOCUMENTS

| | | | | |
|---|---|---|---|---|
| FR | 2761848 A1 | * | 10/1998 | H04Q/7/32 |
| JP | 59-53400 U | | 4/1984 | |
| JP | 60-5337 A | | 1/1985 | |
| JP | 62-43941 A | | 2/1987 | |
| JP | 1-130198 A | | 5/1989 | |
| JP | 2-29054 A | | 1/1990 | |
| JP | 3-42949 A | | 2/1991 | |
| JP | 3-52442 A | | 3/1991 | |
| JP | 03108852 A | * | 4/1991 | H04M/1/26 |
| JP | 3-173248 A | | 7/1991 | |
| JP | 4-306944 A | | 10/1992 | |
| WO | WO 99/01865 A1 | * | 1/1999 | G10L/9/00 |

* cited by examiner

Primary Examiner—Charles Appiah
(74) Attorney, Agent, or Firm—Rothwell, Figg, Ernst & Manbeck (57) ABSTRACT

A portable telephone has a for-recognition voice data storing unit for storing for-recognition voice data, a relation-to-dial information storing unit for storing pieces of dial information respectively to be used to perform a call access, a voice inputting unit for receiving a voice, a voice recognizing unit for recognizing the voice received in the voice inputting unit according to the for-recognition voice data stored in the for-recognition voice data storing unit and extracting dial information corresponding to a recognition result from the relation-to-dial information storing unit, a position detecting unit for detecting a position of the portable telephone relative to a user, and a control unit for performing a call access operation using the dial information extracted in the voice recognizing unit according to position information which is relative to the user and is detected in the position detecting unit. Accordingly, a call access processing adapted to use conditions of the user can be performed.

11 Claims, 7 Drawing Sheets

PORTABLE TELEPHONE

CROSS-REFERENCE TO THE RELATED APPLICATION

This application is a continuation of International Application No. PCT/JP99/04059, whose International filing date is Jul. 28, 1999, the disclosures of which Application are incorporated by reference herein. The present application has not been published in English.

BACKGROUND OF THE INVENTION

1. Field of the Invention

The present invention relates to a portable telephone with a voice recognition function.

2. Description of Related Art

A conventional voice dial function in which a dial number or voice data relating to the dial number is input according to a voice recognition function is known as a technique in which the load on a push-down operation on dial buttons of a portable telephone is reduced.

In general, during the voice dial function, a screen image, a voice signal or a tone of a portable telephone instructs a user to emit a voice input while using a specific key input indicating a start as a trigger. Thereafter, a voice input by the user is converted in analog-to-digital, an acoustic/language processing is performed for the converted voice signal, a highest likelihood recognized candidate is searched according to the similarity between the voice signal and data registered in advance by the user or data registered in advance in the portable telephone. Thus a dial number relating to the voice signal is retrieved. This retrieval result expressed by a screen image or a voice signal is indicated to the user, and the procedure proceeds to a call access operation automatically or in response to a further key input of the user.

In the above steps of the procedure, in cases where a call access operation is finally performed, there are following call access operations mainly according to a user's subjective reliance on a voice recognition function.

In one call access operation, the portable telephone is placed in front of the user to enable the user to see a screen image indicating the retrieved dial number, and the user ascertains the retrieval result expressed by the screen image. Thereafter, the user performs a further key input, and the procedure proceeds to the call access operation.

In another call access operation, to enable the user to immediately perform a voice conversation, the user ascertains the retrieval result expressed by a voice signal while putting the portable telephone close to one ear of the user, and the procedure automatically proceeds to the call access operation.

When the above-described call access operations are finally performed, in cases where a call access is performed in response to the key input performed after the display of the screen image, an error phone call caused by an erroneous recognition as a result of background noise or the like, can be easily prevented. However, even though the user desires to immediately perform a call access, unless the user performs a further key input, a call access operation is not performed. In contrast, in cases where a call access is automatically performed, a telephone operation is not complicated by the condition that the recognition result is correct. However, due to the fact that a user may want to confirm a recognition result or to use the portable telephone in environments often resulting in erroneous recognition, there is a high probability that an error phone call is performed due to the automatic performance of call access. Therefore, there is a problem that a call access processing adapted to use conditions and/or use environments of the user's portable telephone cannot be performed.

SUMMARY OF THE INVENTION

An object of the present invention is to provide, with due consideration to the drawbacks of the conventional portable telephone, a portable telephone in which a call access processing adapted to use conditions and use environments of the portable telephone of a user is performed by automatically performing a call access operation without a further key input, in cases where the user desires to automatically perform a call access or in cases where the portable telephone is used in an environment in which an erroneous recognition hardly occurs, and by performing a call access operation in response to a call access request of a user in cases where the user desires to perform the call access operation after the confirmation of a recognition result or in cases where the portable telephone is used in an environment in which an erroneous recognition easily occurs.

A portable telephone according to the present invention comprises a for-recognition voice data storing unit for storing for-recognition voice data, a relation-to-dial information storing unit for storing pieces of dial information respectively to be used to perform a call access, a voice inputting unit for receiving a voice signal, a voice recognizing unit for recognizing the voice signal received in the voice inputting unit according to the for-recognition voice data stored in the for-recognition voice data storing unit and extracting dial information corresponding to a recognition result from the relation-to-dial information storing unit, a position detecting unit for detecting a position of the portable telephone relative to a user, and a control unit for performing a call access operation according to position information, which is relative to the user and is detected in the position detecting unit, by using the dial information extracted in the voice recognizing unit.

Therefore, because a call access operation is performed according to the position information of the portable telephone relative to the user, a call access processing adapted to use conditions of the user can be performed.

In a portable telephone according to the present invention, the position of the portable telephone relative to the user is detected in the position detecting unit by detecting whether or not the portable telephone is in proximity to the ear of the user.

Therefore, because it is detected whether or not the portable telephone is in proximity to the ear of, a call access processing adapted to use conditions of the user can be performed.

In a portable telephone according to the present invention, the call access operation using the dial information extracted in the voice recognizing unit is performed in the control unit in cases where it is detected in the position detecting unit that the portable telephone is in proximity to the ear of the user, and the call access operation using the dial information extracted in the voice recognizing unit is performed in the control unit after the reception of a call access request of the user in cases where it is detected in the position detecting unit that the portable telephone is not in proximity to the ear of the user.

Therefore, in cases where the portable telephone is in proximity to the ear of the user, a call access operation is automatically performed. Accordingly, inconvenience associated with key input operations can be eliminated. Also, in cases where the portable telephone is not in proximity to the ear of the user, a call access operation is performed after the reception of a call access request of the user. Accordingly, an error phone call can be prevented, and a call access processing adapted to use conditions of the user can be performed.

A portable telephone according to the present invention further comprises an external voice input/output apparatus detecting unit for detecting whether or not an external voice input/output apparatus is connected with the portable telephone, and the call access operation using the dial information extracted in the voice recognizing unit is performed in the control unit according to both the position information, which is relative to the user and is detected in the position detecting unit and information which is detected in the external voice input/output apparatus detecting unit and indicates whether or not the external voice input/output apparatus is connected with the portable telephone.

Therefore, a call access operation is performed according to both the position information relative to the user and information indicating whether or not the external voice input/output apparatus is connected with the portable telephone. Accordingly, a call access processing adapted to use conditions of the user can be performed.

In a portable telephone according to the present invention, the call access operation using the dial information extracted in the voice recognizing unit is performed in the control unit in cases where it is detected in the position detecting unit that the portable telephone is in proximity to the ear of the user, the call access operation using the dial information extracted in the voice recognizing unit is performed in the control unit in cases where it is detected in the position detecting unit that the portable telephone is not in proximity to the ear of the user and in cases where it is detected in the external voice input/output apparatus detecting unit that the external voice input/output apparatus is connected with the portable telephone, and the call access operation using the dial information extracted in the voice recognizing unit is performed in the control unit after the reception of a call access request of the user in cases where it is detected in the position detecting unit that the portable telephone is not in proximity to the ear of the user and in cases where it is detected in the external voice input/output apparatus detecting unit that the external voice input/output apparatus is not connected with the portable telephone.

Therefore, a call access processing adapted to use conditions of the user can be performed according to both a condition of whether or not the portable telephone is in proximity to the ear of the user and a condition of whether or not the external voice input/output apparatus is connected with the portable telephone.

A portable telephone according to the present invention comprises a for-recognition voice data storing unit for storing for-recognition voice data, a relation-to-dial information storing unit for storing pieces of dial information respectively to be used to perform a call access, a voice inputting unit for receiving a voice signal, a voice recognizing unit for recognizing the voice signal received in the voice inputting unit according to the for-recognition voice data stored in the for-recognition voice data storing unit and extracting dial information corresponding to a recognition result from the relation-to-dial information storing unit, and a control unit for performing a call access operation according to information, which indicates whether or not a recognition processing is started in the voice recognizing unit in response to a key input for an automatic call access, by using the dial information extracted in the voice recognizing unit.

Therefore, a call access processing adapted to use conditions of the user can be performed according to a condition of whether or not a key input for an automatic call access is performed.

In a portable telephone according to the present invention, the call access operation using the dial information extracted in the voice recognizing unit is performed in the control unit in cases where a recognition processing is started in the voice recognizing unit in response to a key input for an automatic call access, and the call access operation using the dial information extracted in the voice recognizing unit is performed in the control unit after the reception of a call access request of the user in cases where a recognition processing is started in the voice recognizing unit without a key input for an automatic call access.

Therefore, a call access processing adapted to use conditions of the user can be performed according to a condition of whether or not a key input for an automatic call access is performed.

A portable telephone according to the present invention comprises a for-recognition voice data storing unit for storing for-recognition voice data, a relation-to-dial information storing unit for storing pieces of dial information respectively to be used to perform a call access, a voice inputting unit for receiving a voice signal, a voice recognizing unit for recognizing the voice signal received in the voice inputting unit according to the for-recognition voice data stored in the for-recognition voice data storing unit, extracting dial information corresponding to a recognition result from the relation-to-dial information storing unit and comparing a parameter value obtained in a voice analysis of a recognition processing and a prescribed threshold value, and a control unit for performing a call access operation, in which the dial information extracted in the voice recognizing unit is used, according to a comparison result between the parameter value obtained in the voice analysis of the recognition processing of the voice recognizing unit and the prescribed threshold value.

Therefore, a call access processing adapted to use environments of the portable telephone can be performed.

In a portable telephone according to the present invention, an S/N ratio of the voice signal received in the voice inputting unit is used in the voice recognizing unit as the parameter in the voice analysis of the recognition processing.

Therefore, a call access processing corresponding to the S/N ratio of the voice signal can be performed.

In a portable telephone according to the present invention, a level of noise received in the voice inputting unit is used in the voice recognizing unit as the parameter in the voice analysis of the recognition processing.

Therefore, a call access processing corresponding to the level of the noise received in the voice inputting unit can be performed.

DETAILED DESCRIPTION OF THE PREFERRED EMBODIMENTS

The invention will now be described with reference to the accompanying drawings.

Embodiment 1

Figure 1:
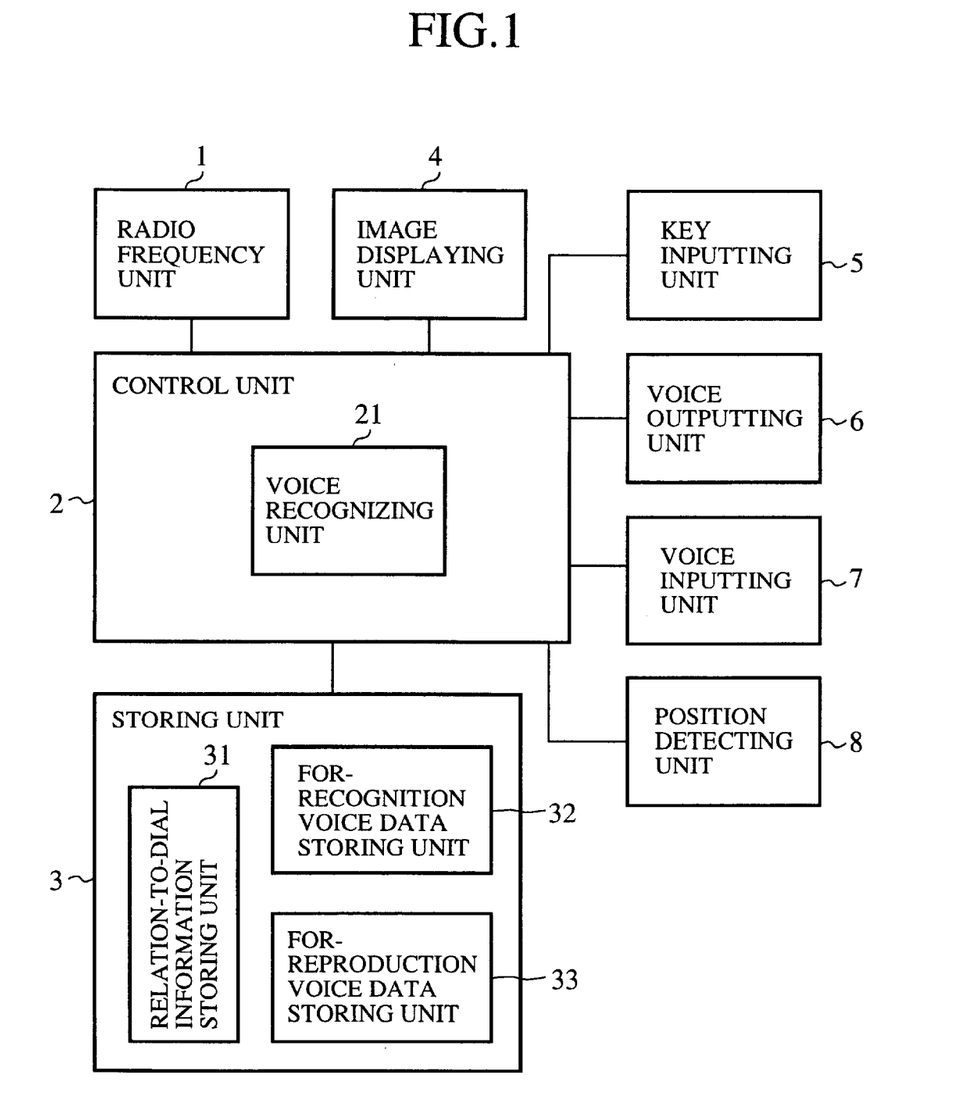
FIG. 1 is a block diagram showing the configuration of a portable telephone according to a first embodiment of the present invention.

FIG. 1 is a block diagram showing the configuration of a portable telephone according to a first embodiment of the present invention. In FIG. 1, 1 indicates a radio frequency unit for transmitting and receiving radio wave. 2 indicates a control unit for controlling the whole processing of a portable telephone. 3 indicates a storing unit for storing pieces of information relating to dial numbers and voice data. 4 indicates an image displaying unit for displaying a dial number or the like. 5 indicates a key inputting unit for receiving a result of a key operation performed by a user. 6 indicates a voice outputting unit for outputting a voice signal. 7 indicates a voice inputting unit for receiving a voice signal. 8 indicates a position detecting unit for detecting a relative position of the portable telephone to the user by putting the portable telephone close to an ear of the user. A temperature sensor or a light sensor is used as the position detecting unit 8.

Also, in FIG. 1, 21 indicates a voice recognizing unit, arranged in the control unit 2, for analyzing and recognizing a voice signal of the user received in the voice inputting unit 7 to perform a call access. 31 indicates a relation-to-dial information storing unit, arranged in the storing unit 3, for storing dial numbers and pieces of relation-to-dial information indicating names of persons relating to the dial numbers. 32 indicates a for-recognition voice data storing unit, arranged in the storing unit 3, for storing voice data to be used to analyze and recognize the voice signal of the user. 33 indicates a for-reproduction voice data storing unit for storing voice data to be used to inform the user of a voice recognition result, which is obtained in the voice recognizing unit 21, in a voice signal.

Next, an operation is described.

Figure 2:
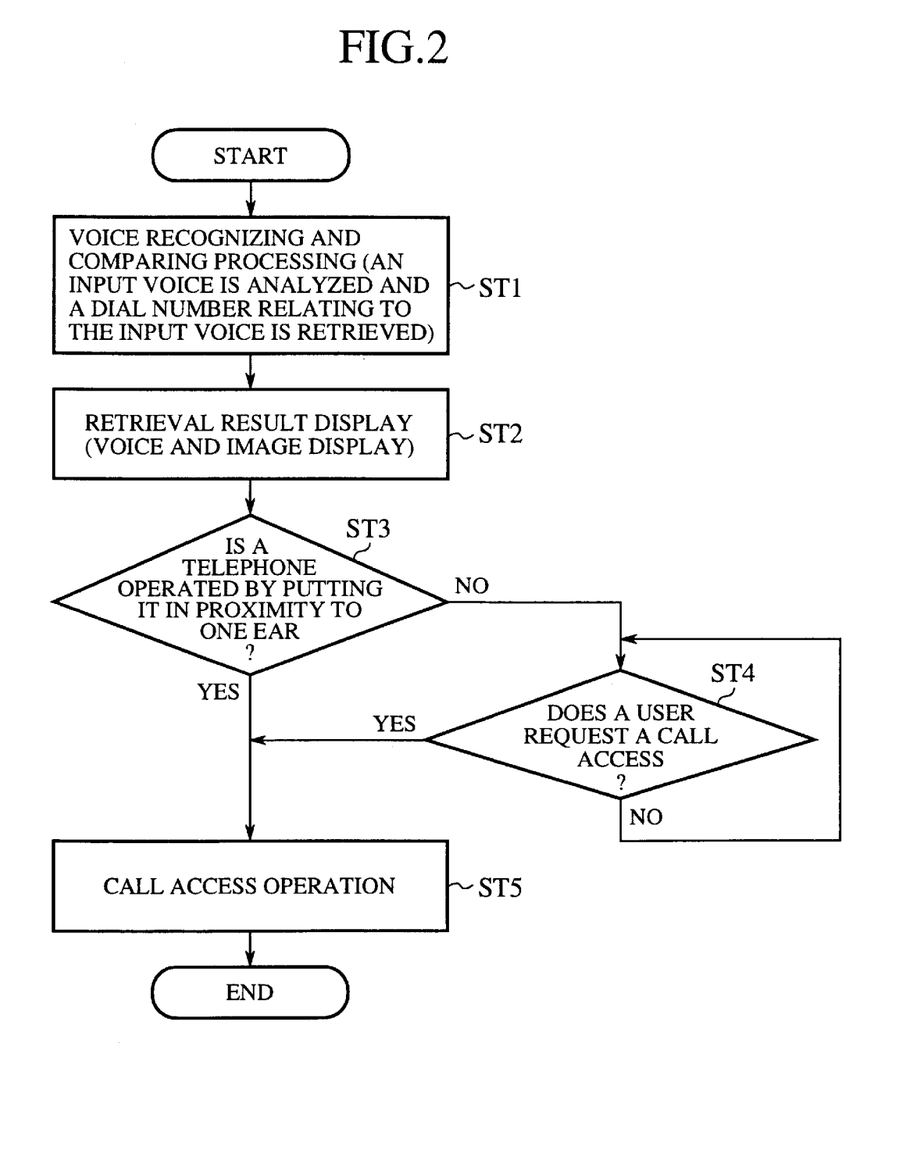
FIG. 2 is a flow chart showing a call access processing according to the first embodiment of the present invention.

FIG. 2 is a flow chart showing a call access processing according to the first embodiment of the present invention. In a step S1, a voice signal of a user received in the voice inputting unit 7 is analyzed and recognized in the voice recognizing unit 21 by using for-recognition voice data stored in the for-recognition voice data storing unit 32, and a dial number corresponding to the recognized voice is retrieved from the relation-to-dial information storing unit 31.

In a step ST2, the voice recognizing unit 21 controls the image displaying unit 4 to display the retrieved dial number and controls the voice outputting unit 6 to output the retrieved dial number in a voice output, and the voice recognizing unit 21 informs the user of the retrieved dial number.

In a step ST3, it is detected in the position detecting unit 8 whether or not the user puts his portable telephone in proximity to an ear. In cases where it is detected that the user puts his portable telephone in proximity to an ear, a call access operation is performed under control of the control unit 2 in a step ST5.

In contrast, in cases where it is detected in the step ST3 that the user does not put his portable telephone in proximity to an ear, the control unit 2 waits for a call access request of the user in a step ST4. In cases where the control unit 2 receives a call access request from the user through the key inputting unit 5, a call access operation is performed in the step ST5.

As is described above, in the first embodiment, in cases where the user desires to immediately perform a call access because the user desires to remove the inconvenience associated with key input operations, the user puts his portable telephone in proximity to an ear, and the call access is automatically performed without a further key input. In contrast, in cases where the user desires to perform a call access after the confirmation of a recognized result because the user desires to avoid an error phone call, the user does not put his portable telephone in proximity to an ear, the call access is not automatically performed, and a call access is performed after the reception of a further key input which is performed by the user to perform the call access. Accordingly, a call access processing adapted to use conditions of the user can be performed.

Embodiment 2

Figure 3:
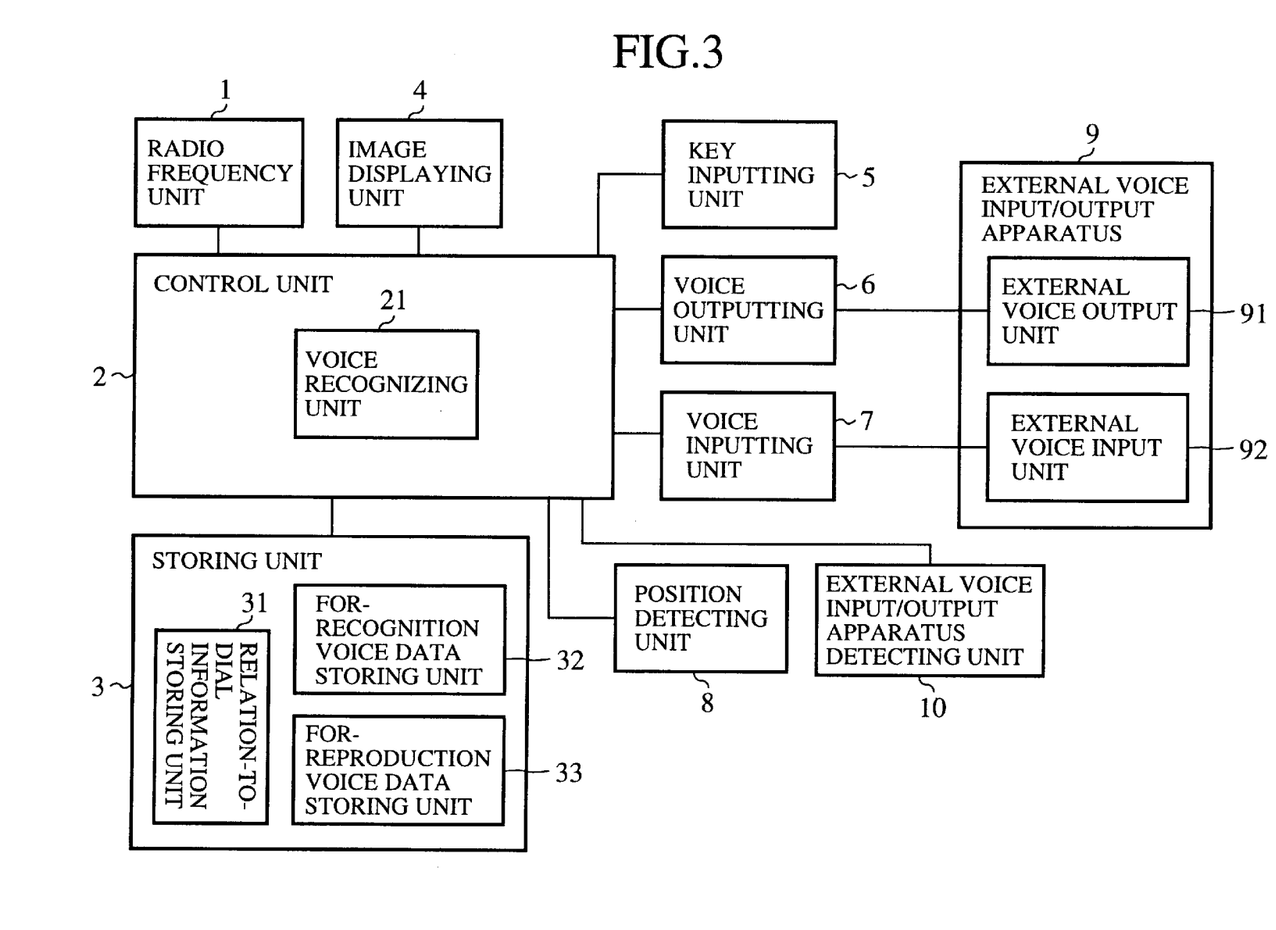
FIG. 3 is a block diagram showing the configuration of a portable telephone according to a second embodiment of the present invention.

FIG. 3 is a block diagram showing the configuration of a portable telephone according to a second embodiment of the present invention. In FIG. 3, 9 indicates an external voice input/output apparatus made of a hand-free kit or an earphone-microphone set. 91 indicates an external voice output unit connected with the voice outputting unit 6. 92 indicates an external voice input unit connected with the voice inputting unit 7.

Also, in FIG. 3, 10 indicates an external voice input/output apparatus detecting unit for detecting whether or not the external voice input/output apparatus 9 is connected with the portable telephone. For example, when it is detected whether an input port of the portable telephone is made open or is electrically set to a short condition, and the connection (or no connection) of the external voice input/output apparatus 9 with the portable telephone can be detected. The other configuration is the same as that of the first embodiment shown in FIG. 1.

Next, an operation is described.

Figure 4:
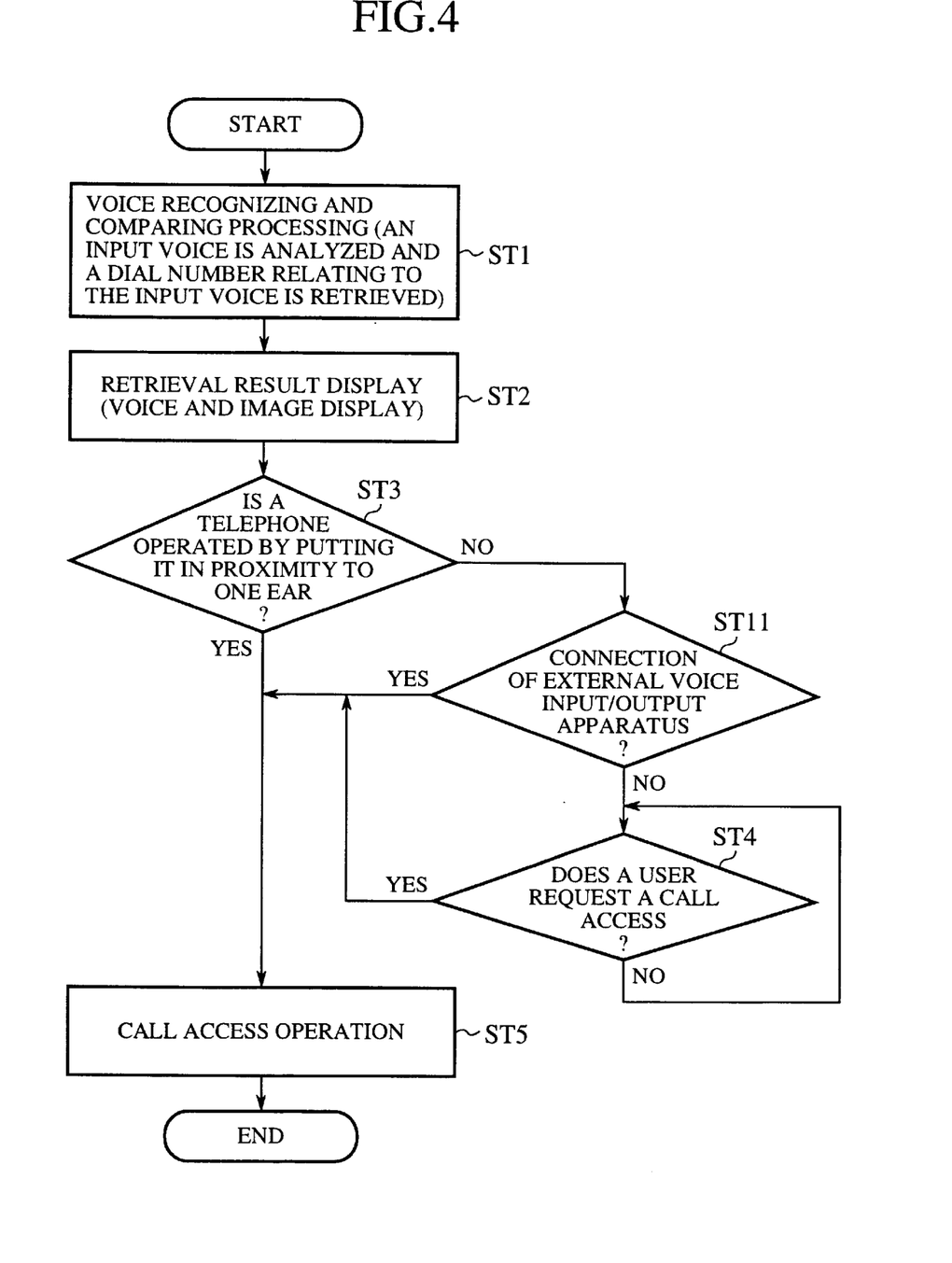
FIG. 4 is a flow chart showing a call access processing according to the second embodiment of the present invention.

FIG. 4 is a flow chart showing a call access processing according to the second embodiment of the present invention. The steps ST1, ST2, ST3, ST4 and ST5 are the same as those of the first embodiment shown in FIG. 2.

In cases where it is detected in the step ST3 that the user does not put his portable telephone in proximity to an ear, it is detected in the external voice input/output apparatus detecting unit 10 in a step ST11 whether or not the external voice input/output apparatus 9 is connected with the portable telephone.

In cases where it is detected in the step ST11 that the external voice input/output apparatus 9 is connected with the portable telephone, the procedure proceeds to the step ST5, and a call access operation is performed under control of the control unit 2. In contrast, in cases where it is detected in the step ST11 that the external voice input/output apparatus 9 is not connected with the portable telephone, the procedure proceeds to the step ST4, and the control unit 2 waits for a call access request which is performed by the key input of the user. In cases where the control unit 2 receives a call access request from the user, the procedure proceeds to the step ST5, and a call access operation is performed under control of the control unit 2.

As is described above, in the second embodiment, in cases where the user desires to immediately perform a call access because the user desires to remove the inconvenience associated with key input operations, the user puts his portable telephone close to his ear, and the call access is automatically performed without a further key input. In contrast, in cases where the external voice input/output apparatus 9 is connected with the portable telephone, even though the user does not put the portable telephone in proximity to an ear, the call access is automatically performed without a further key input. Also, in cases where the external voice input/output apparatus 9 is not connected with the portable telephone and in cases where the user does not put the portable telephone in proximity to an ear, a call access is performed after the reception of a call access request of the user. Accordingly, a call access processing adapted to use conditions of the user can be performed.

Embodiment 3

Figure 5:
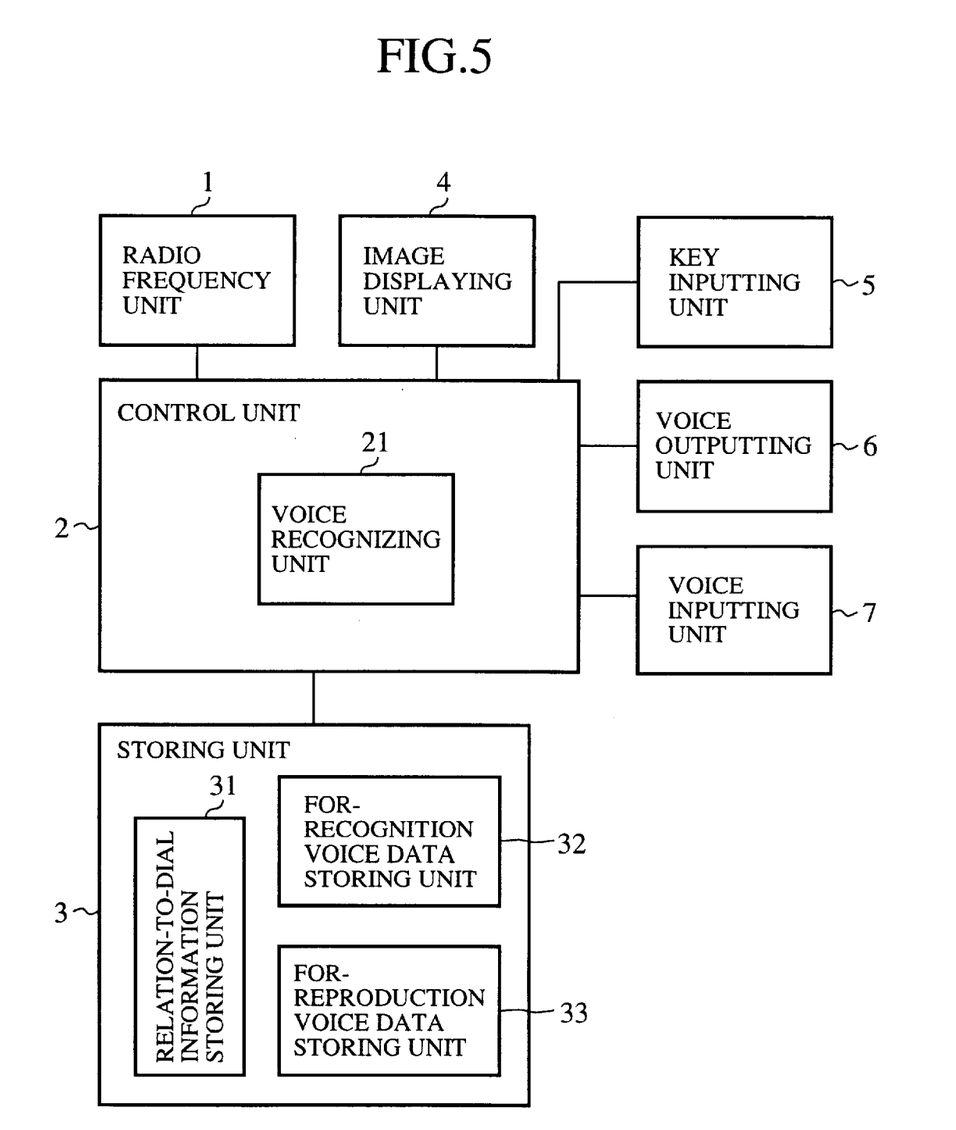
FIG. 5 is a block diagram showing the configuration of a portable telephone according to a third embodiment of the present invention.

FIG. 5 is a block diagram showing the configuration of a portable telephone according to a third embodiment of the present invention. In FIG. 5, a portable telephone is obtained by removing the position detecting unit 8 from that of the first embodiment shown in FIG. 1.

Next, an operation is described.

Figure 6:
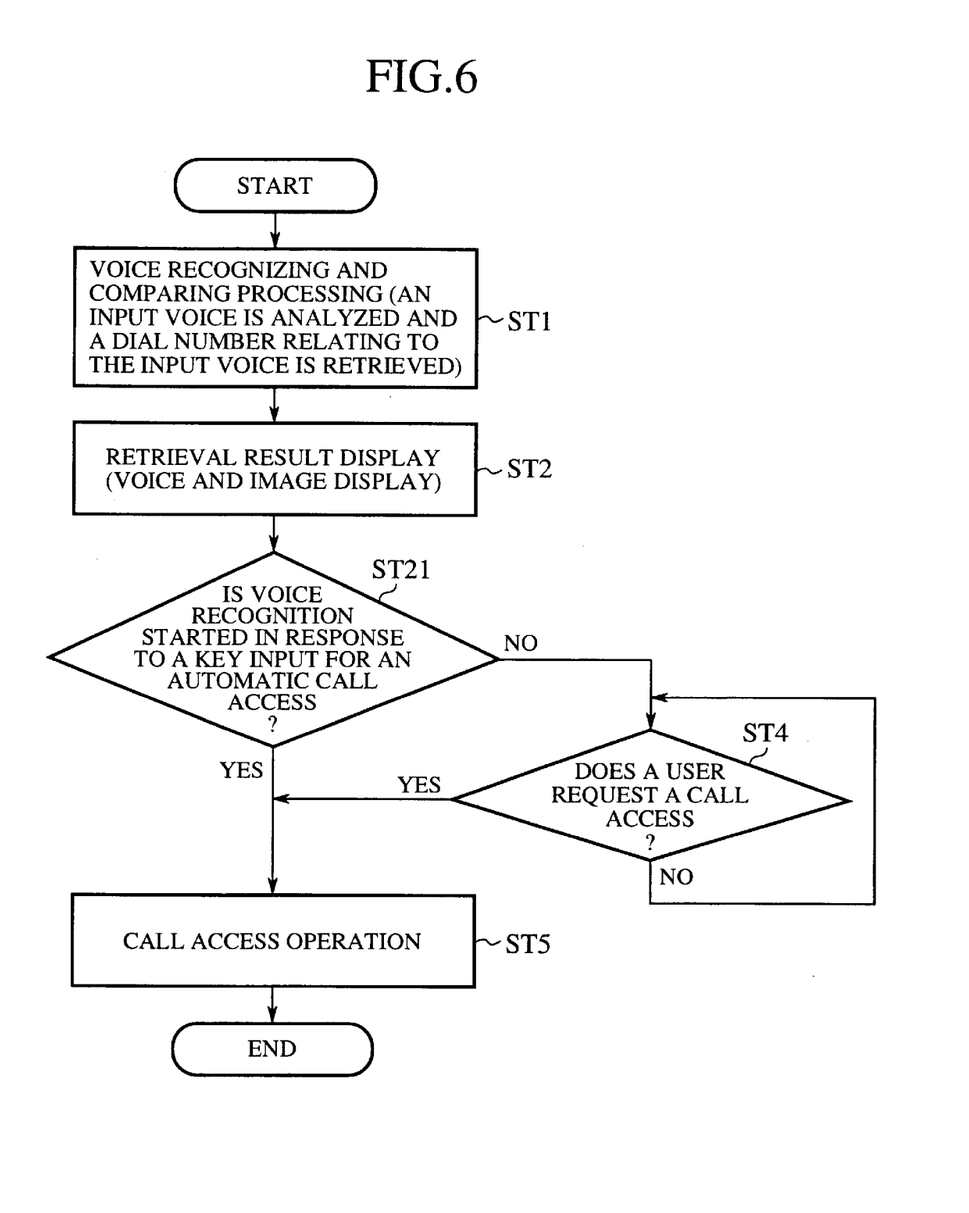
FIG. 6 is a flow chart showing a call access processing according to the third embodiment of the present invention.

FIG. 6 is a flow chart showing a call access processing according to the third embodiment of the present invention. The steps ST1, ST2, ST4 and ST5 are the same as those of the first embodiment shown in FIG. 2.

In cases where a dial number retrieved in the voice recognizing unit 21 is displayed on the image displaying unit 4 and is output as a voice output by the function of the voice outputting unit 6 in the step ST2, the control unit 2 judges in a step ST21 whether or not the voice recognizing and comparing processing of the step ST1 is started in response to a key input for an automatic call access.

In cases where the control unit 2 detects in the step ST21 that the voice recognizing and comparing processing is started in response to a key input for an automatic call access, the procedure proceeds to the step ST5, and a call access operation is performed under control of the control unit 2. In contrast, in cases where the control unit 2 detects that the voice recognizing and comparing processing to be performed in response to a key input for an automatic call access is not started, the procedure proceeds to the step ST4, and the control unit 2 waits for a key input of the user.

As is described above, in the third embodiment, in cases where the user desires to immediately perform a call access because the user desires to remove the inconvenience associated with key input operations, the user performs a key input for an automatic call access, and the call access is automatically performed without a further key input. In contrast, in cases where the user desires to perform a call access after the confirmation of a recognized result because the user desires to avoid an error phone call, the user does not perform a key input for an automatic call access, a call access is not automatically performed, and a call access is performed after the reception of a further key input of the user for the call access. Accordingly, a call access processing adapted to use conditions of the user can be performed.

Embodiment 4

The configuration of a portable telephone according to a fourth embodiment is the same as that of the third embodiment shown in FIG. 5.

Next, an operation is described.

Figure 7:
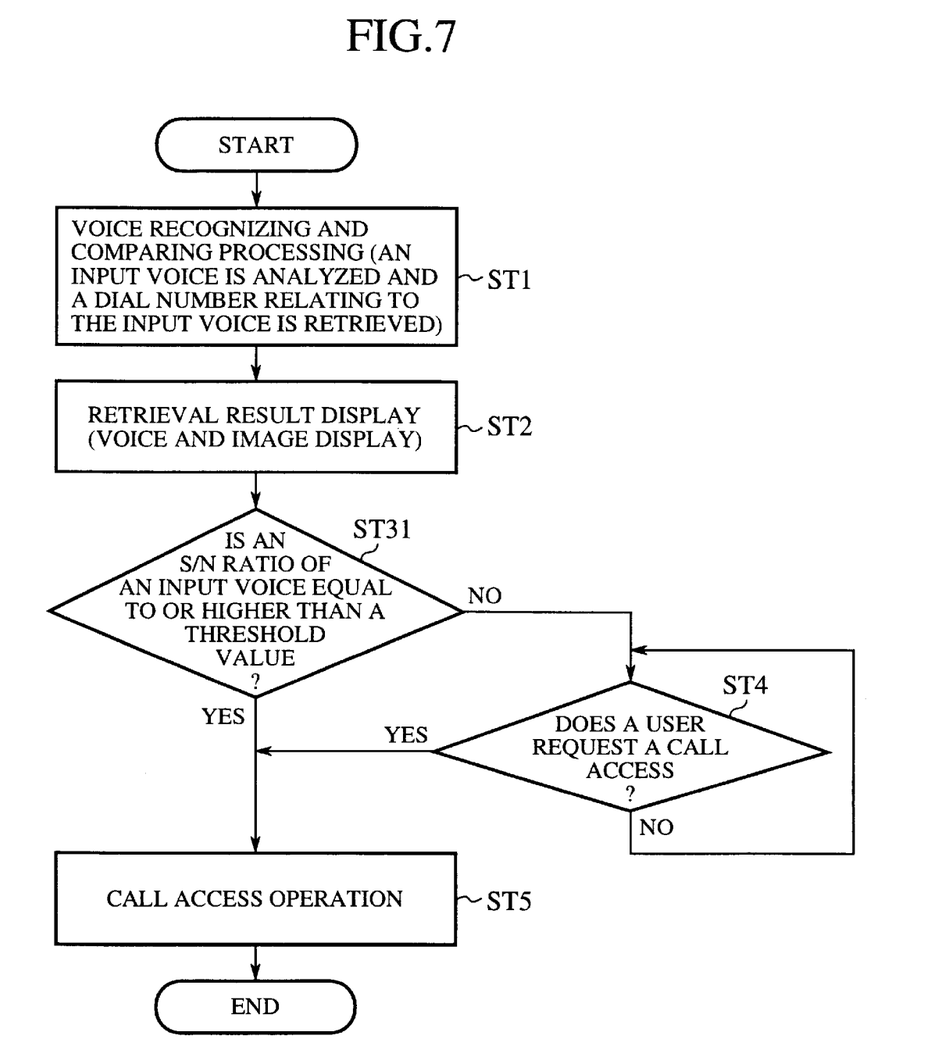
FIG. 7 is a flow chart showing a call access processing according to a fourth embodiment of the present invention.

FIG. 7 is a flow chart showing a call access processing according to the fourth embodiment of the present invention. The steps ST1, ST2, ST4 and ST5 are the same as those of the first embodiment shown in FIG. 2.

In cases where a dial number retrieved in the voice recognizing unit 21 is displayed on the image displaying unit 4 and is output as a voice output by the function of the voice outputting unit 6 in the step ST2, it is judged in the voice recognizing unit 21 in a step ST31 whether or not a ratio of a signal level to a noise level (S/N ratio), which is one of parameters in the voice analysis of the voice recognizing processing, in the voice output received in the voice inputting unit 7 is, for example, equal to or higher than a prescribed threshold value. In cases where it is judged in the step ST31 that the S/N ratio of the voice signal is equal to or higher than the prescribed threshold value, the procedure proceeds to the step ST5, and a call access-operation is performed. In contrast, in cases where the S/N ratio of the voice signal is lower than the prescribed threshold value, the procedure proceeds to the step ST4, and the control unit 2 waits for a call access request of the user.

In this embodiment, it is determined according to the S/N ratio whether or not an automatic call access is performed. However, it is applicable that it be determined according to a simple noise level whether or not an automatic call access is performed. That is, in cases where a noise level is equal to or lower than a prescribed threshold value in the step ST31, the procedure proceeds to the step ST5, and a call access operation is performed. In contrast, in cases where a noise level is higher than the prescribed threshold value, the procedure proceeds to the step ST4, and the control unit 2 waits for a call access request of the user.

As is described above, in the fourth embodiment, in cases where the portable telephone is used in environments, in which an erroneous recognition hardly occurs, because the S/N ratio of the input voice signal is equal to or higher than a prescribed threshold value, a call access is automatically performed without a further key input. In contrast, in cases where the portable telephone is used in environments, in which an erroneous recognition easily occurs, because the S/N ratio of the input voice signal is lower than the prescribed threshold value, a call access is not automatically performed, and a call access is performed after the reception of a further key input of the user for the call access. Accordingly, a call access processing adapted to use environments of the user can be performed.

As is described above, the portable telephone according to the present invention is appropriate to perform a call access processing adapted to use conditions and use environments of the portable telephone of a user.

What is claimed is:

1. A portable telephone, comprising:
    a for-recognition voice data storing unit for storing voice data for comparison with a received voice signal;
    a relation-to-dial information storing unit for storing telephone number dial information to be used to perform a call access, said telephone number dial information being associated with corresponding voice data in said for-recognition voice data storing unit;
    a voice inputting unit for receiving a voice signal;
    a voice recognizing unit for recognizing the voice signal received in the voice inputting unit by comparing the received voice signal with the stored voice data in the for-recognition voice data storing unit and extracting telephone number dial information corresponding to voice data from the relation-to-dial information storing unit matching said received voice signal;
    a position detecting unit for detecting a position of the portable telephone relative to a user; and a control unit for performing a call access operation according to position information, which is relative to the user and is detected in the position detecting unit, by using the dial information extracted in the voice recognizing unit to automatically initiate a call access operation when said position information indicates that a user desires to automatically place a call through voice recognition.

2. A portable telephone according to claim 1 in which the position of the portable telephone relative to the user is detected in the position detecting unit by detecting whether or not the portable telephone is in proximity to an ear of the user.

3. A portable telephone according to claim 2 in which the call access operation using the dial information extracted in the voice recognizing unit is performed in the control unit in cases where it is detected in the position detecting unit that the portable telephone is in proximity to the ear of the user, and the call access operation using the dial information extracted in the voice recognizing unit is performed in the control unit after the reception of a call access request of the user in cases where it is detected in the position detecting unit that the portable telephone is not in proximity to the ear of the user.

4. A portable telephone according to claim 1, further comprising:
an external voice input/output apparatus detecting unit for detecting whether or not an external voice input/output apparatus is connected with the portable telephone, wherein the call access operation using the dial information extracted in the voice recognizing unit is performed in the control unit according to both the position information, which is relative to the user and is detected in the position detecting unit and information which is detected in the external voice input/output apparatus detecting unit and indicates whether or not the external voice input/output apparatus is connected with the portable telephone.

5. A portable telephone according to claim 4 in which the call access operation using the dial information extracted in the voice recognizing unit is performed in the control unit in cases where it is detected in the position detecting unit that the portable telephone is in proximity to the ear of the user, the call access operation using the dial information extracted in the voice recognizing unit is performed in the control unit in cases where it is detected in the position detecting unit that the portable telephone is not in proximity to the ear of the user and in cases where it is detected in the external voice input/output apparatus detecting unit that the external voice input/output apparatus is connected with the portable telephone, and the call access operation using the dial information extracted in the voice recognizing unit is performed in the control unit after the reception of a call access request of the user in cases where it is detected in the position detecting unit that the portable telephone is not in proximity to the ear of the user and in cases where it is detected in the external voice input/output apparatus detecting unit that the external voice input/output apparatus is not connected with the portable telephone.

6. A portable telephone, comprising:
a for-recognition voice data storing unit for storing data for comparison with a received voice signal;
a relation-to-dial information storing unit for storing telephone number dial information to be used to perform a call access, said telephone number dial information being associated with corresponding voice data in said for-recognition voice data storing unit;

a voice inputting unit for receiving a voice signal;
a voice recognizing unit for recognizing the voice signal received in the voice inputting unit by comparing the received voice signal with the stored voice data in the for-recognition voice data storing unit and extracting telephone number dial information corresponding to voice data from the relation-to-dial information storing unit matching said received voice signal; and
a control unit for performing a call access operation according to certain information, which certain information indicates whether or not a recognition process is started in the voice recognizing unit in response to a key input for an automatic call access, by using the dial information extracted in the voice recognizing, unit; wherein
said call access operation is performed automatically in said control unit in cases where a recognition process is started in said voice recognizing unit and a key input for automatic call access has been made, and said call access operation is performed in said control unit after the reception of a call access request of a user in cases where a recognition process is started in said voice recognizing unit without a key input for automatic call access.

7. A portable telephone, comprising:
a for-recognition voice data storing unit for storing voice data for comparison with a received voice signal;
a relation-to-dial information storing unit for storing telephone number dial information to be used to perform a call access, said telephone number dial information being associated with corresponding voice data in said for-recognition voice data storing unit;
a voice inputting unit for receiving a voice signal;
a voice recognizing unit for recognizing the voice signal received in the voice inputting unit by comparing the received voice signal with the stored voice data in the for-recognition voice data storing unit, extracting telephone number dial information corresponding to voice data from the relation-to-dial information storing unit matching said received voice signal, and comparing a parameter value obtained in a voice analysis of a recognition processing and a prescribed threshold value; and
a control unit for performing a call access operation, in which the telephone number dial information extracted in the voice recognizing unit is used, according to a comparison result between said obtained parameter value and the prescribed threshold value; wherein
said call access operation is performed automatically in said control unit in cases where the parameter value in the voice analysis of the recognition processing is within a predetermined permissible range, and said call access operation is performed in said control unit in response to the reception of a call access request of a user in cases where the parameter value in the voice analysis of the recognition processing unit is not within the predetermined permissible range.

8. A portable telephone according to claim 7 in which an S/N ratio of the voice received in the voice inputting unit is used in the voice recognizing unit as the parameter in voice analysis of the recognition processing.

9. A portable telephone according to claim 7 in which a level of noise received in the voice inputting unit is used in the voice recognizing unit as the parameter in voice analysis of the recognition processing.

10. A portable telephone, comprising:

a for-recognition voice data storing unit for storing voice data for comparison with a received voice signal;

a relation-to-dial information storing unit for storing telephone number dial information to be used to perform a call access, said telephone number dial information being associated with corresponding voice data in said for-recognition voice data storing unit;

a voice inputting unit for receiving a voice signal;

a voice recognizing unit for recognizing the voice signal received in the voice inputting unit by comparing the received voice signal with the stored voice data in the for-recognition voice data storing unit and extracting telephone dial information corresponding to voice data from the relation-to-dial information storing unit matching said received voice signal;

a condition detecting unit for detecting a condition indicating suitability of performing a call access operation in response to extraction of telephone number dial information from said relation-to-dial information storing unit; and a control unit for performing a call access operation in response to the existence of said condition indicating suitability of automatic performance of a call access operation in response to a recognized voice input having corresponding telephone number dial information stored in said relation-to-dial information storing unit, and waiting for a specific user request to perform a call access operation subsequent to extraction of telephone number dial information in the absence of said condition, wherein said condition is a detected proximity of an ear of a user to a speaker of said telephone unit.

11. A portable telephone, comprising:

a for-recognition voice data storing unit for storing voice data for comparison with a received voice signal;

a relation-to-dial information storing unit for storing telephone number dial information to be used to perform a call access, said telephone number dial information being associated with corresponding voice data in said for-recognition voice data storing unit;

a voice inputting unit for receiving a voice signal;

a voice recognizing unit for recognizing the voice signal received in the voice inputting unit by comparing the received voice signal with the stored voice data in the for-recognition voice data storing unit and extracting telephone dial information corresponding to voice data from the relation-to-dial information storing unit matching said received voice signal;

a condition detecting unit for detecting a condition indicating suitability of performing a call access operation in response to extraction of telephone number dial information from said relation-to-dial information storing unit; and a control unit for performing a call access operation in response to the existence of said condition indicating suitability of automatic performance of a call access operation in response to a recognized voice input having corresponding telephone number dial information stored in said relation-to-dial information storing unit, and waiting for a specific user request to perform a call access operation subsequent to extraction of telephone number dial information in the absence of said condition, wherein said condition is a detected voice parameter value above a predetermined threshold.

* * * * *